Sept. 12, 1950  E. R. BAER  2,521,819
HOISTING DOLLY TRUCK
Filed Oct. 25, 1947

INVENTOR.
E. R. BAER

Patented Sept. 12, 1950

2,521,819

UNITED STATES PATENT OFFICE 2,521,819

HOISTING DOLLY TRUCK

Edward Ray Baer, Hamilton, Ontario, Canada

Application October 25, 1947, Serial No. 782,146

4 Claims. (Cl. 214—65)

This invention relates to trucks such as are used for raising crates, boxes and the like from a floor and then transporting them from place to place.

In the very common form of truck the body of the truck is held vertical, the nose is forced beneath an edge of a load to be moved and the truck body is tilted backwardly while the load is held, manually or otherwise, against the truck body. This brings the weight of the load over the truck wheels whereupon, by careful balancing, the load may be transported.

One principal object of this invention is to provide a novel form of hand truck having improved means whereby the truck may be caused to lift the engaged edge of a load vertically without tilting of the truck.

A second important object of the present invention is to provide a novel and efficient toggle lever means whereby the vertically lifted load is borne by a pair of caster wheels.

A third important object of the invention is to provide a novel construction of truck by which two of such trucks may be used to support opposite sides or ends of a crate, box or other load and the supported load be capable of being moved along any path desired.

With the above and other objects in view, as will be presently apparent, the invention consists in general of certain novel details of construction and combinations of parts hereinafter fully described, illustrated in the accompanying drawings and particularly claimed.

In the accompanying drawings like characters of reference indicate like parts in the several views, and:

Figure 1:
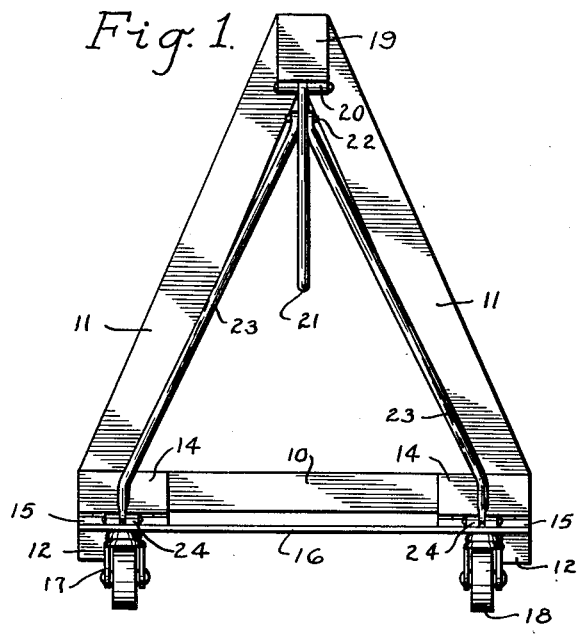
Fig. 1 is a rear elevation of the improved truck in load supporting position.

In the invention as here shown there is provided a plate metal triangular frame substantially in the form of an isosceles triangle, the frame having a base member 10 and upwardly converging sides 11. Extending forwardly from the lower edge of the member 10 is a nose 12 carrying at its forward edge one or more upstanding sharp teeth 13 for engagement into the material of a box or crate and thus to prevent accidental disengagement of the truck from its load.

Suitably fixed to the rear face of the member 10 at its ends, as by welding, riveting or otherwise, is a pair of plates 14 having hinges 15 at their lower edges by means of which a swinging plate 16 is secured to the plates 14 for vertical swinging movement between a horizontal position and an upwardly inclined position. The plate 16 carries, adjacent its ends, a pair of pivotally mounted caster yokes 17 which support the caster ground wheels 18. When the plate 16 is horizontal the wheels 18 rest on a floor or other supporting surface and the nose 12 is necessarily raised from such supporting surface. When the plate 16 is inclined upwardly, as in Fig. 3, the wheels 18 are, at the bottom of their peripheries, above the nose 12 so that the latter will rest on such supporting surface.

At the apex of the triangular frame there is fixed a plate 19 which carries at its lower edge a pair of ears 20 between which is pivoted one end of an operating lever 21. To the lever 22, in spaced relation to its pivoted end, there is pivotally connected the upper ends of a pair of links 23 which have their lower ends pivoted to the rear portion of the plate 16 as at 24.

Figure 2:
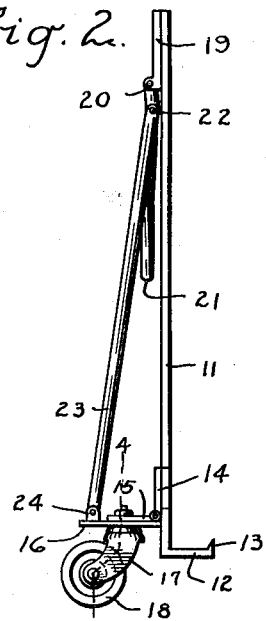
Fig. 2 is a side elevation of Fig. 1.
Figure 3:
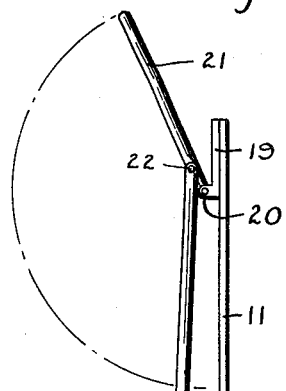
Fig. 3 is a side elevation similar to Fig. 2 but showing the truck in load receiving position.
Figure 5:
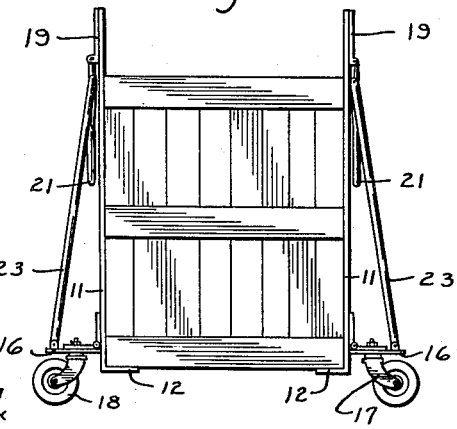
Fig. 5 is a side view showing the manner of supporting a load from opposite position by two trucks constructed in accordance with this invention.
Figure 4:
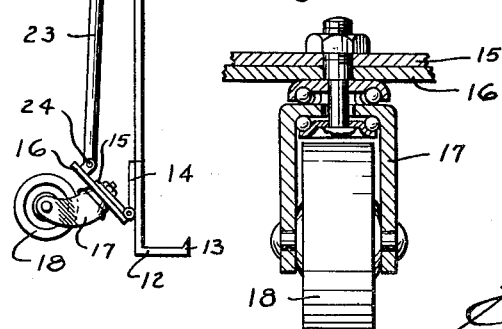
Fig. 4 is an enlarged detail section on the line 4—4 of Fig. 2.

In operation the lever 21 is raised as in Fig. 3. This places the nose 12 on the surface supporting the article (load) to be trucked. The nose is then inserted under the rear edge of the article and the lever moved down to the position of Fig. 2. This brings the wheels 18 onto the supporting surface and then raises the engaged edge of the load. The opposite edge may be similarly raised so that the load will then be free to traverse any path. If the load is not too long one truck, after engagement and tilting, may support the load as does the common warehouse truck.

What is claimed, is:

1. In a truck of the kind described, a body having an article engaging nose projecting forwardly from the lower part of said body, a pair of wheels hingedly supported by said body for movement into and out of ground engaging position, a toggle lever having one end hinged to the top of the frame, and inflexible links connecting said lever with the supports for said wheels whereby downward movement of said lever about its pivot first effects contact of the caster wheels with the ground and thereinafter raises the article engaging means from the ground.

2. In a truck of the kind described, a body having an article engaging nose projecting forwardly from the lower part of said body, a pair of caster wheels hingedly supported by said body for movement into and out of ground engaging position, a toggle lever having one end hinged to the top of the frame, and inflexible links connecting said lever with the supports for said wheels whereby downward movement of said lever about its pivot first effects contact of the caster wheels with the ground and thereinafter raises the article engaging means from the ground.

3. In a truck of the kind described, a frame body of isosceles triangular form having a lower horizontal member and a pair of upwardly converging legs, said body having means to engage an article, hinges at the outer ends of the lower member, a foldable plate carried by said hinges, caster wheels carried by the ends of said plate, and means to move said plate and thereby cause said caster wheels to engage on and disengage from a supporting surface, said means comprising a lever having one end pivoted to the apex of the frame body and inflexible links having their upper ends pivoted to the lever adjacent its apical connection and their other ends pivoted to the rear of said plate whereby downward movement of said lever about its pivot first effects contact of the caster wheels with the ground and thereinafter raises the article engaging means from the ground.

4. In a truck of the kind described, a frame body having a transversely extending vertical lower member provided with an article engaging nose projecting downwardly and forwardly at each end, a plate extending along the rear of said member and hinged thereto at one edge to move between a position substantially vertical parallel to said member and a horizontal position projecting rearwardly of said member, caster wheels carried by the end portions of said plate and projecting from its rear face when the plate is in substantially vertical position, an operating lever pivoted at one end to the central portion of the upper part of the frame, and rigidly inflexible divergent links pivoted to the lever adjacent its pivot at their upper ends and pivoted to the free edge of the plate at their lower ends.

EDWARD RAY BAER.

REFERENCES CITED

The following references are of record in the file of this patent:

UNITED STATES PATENTS

| Number | Name | Date |
| --- | --- | --- |
| 2,359,016 | Wood | Sept. 26, 1944 |
| 2,375,720 | Wood | May 8, 1945 |
| 2,415,655 | Reinert | Feb. 11, 1947 |